United States Patent
Desblancs et al.

(10) Patent No.: US 7,095,728 B2
(45) Date of Patent: Aug. 22, 2006

(54) SYNCHRONIZED CONTENTION RESOLUTION AND BURST TIMING ALLOCATION IN THE OPERATION OF TWO OR MORE INTERFACES

(75) Inventors: Philippe Desblancs, Paris (FR); Frédéric Redondo, Sceaux (FR)

(73) Assignee: Alcatel, Paris (FR)

( * ) Notice: Subject to any disclaimer, the term of this patent is extended or adjusted under 35 U.S.C. 154(b) by 858 days.

(21) Appl. No.: 09/865,721

(22) Filed: May 29, 2001

(65) Prior Publication Data

US 2002/0018459 A1 Feb. 14, 2002

(30) Foreign Application Priority Data

May 30, 2000 (FR) .................................. 00 06932

(51) Int. Cl.
*H04J 3/00* (2006.01)
*H04L 12/413* (2006.01)

(52) U.S. Cl. ...................... 370/336; 370/338; 370/447

(58) Field of Classification Search ................ 370/330, 370/335, 337, 389, 321, 352, 276, 277, 336, 370/447, 338
See application file for complete search history.

(56) References Cited

U.S. PATENT DOCUMENTS

| | | | |
|---|---|---|---|
| 5,402,523 A | 3/1995 | Berg | |
| 5,627,876 A * | 5/1997 | Moon | 370/341 |
| 5,732,076 A | 3/1998 | Ketseoglou et al. | |
| 5,790,527 A * | 8/1998 | Janky et al. | 370/330 |
| 5,881,060 A * | 3/1999 | Morrow et al. | 370/337 |
| 5,960,344 A * | 9/1999 | Mahany | 455/432.2 |
| 6,028,853 A * | 2/2000 | Haartsen | 370/338 |
| 6,173,189 B1 * | 1/2001 | Lockhart | 455/561 |
| 6,178,323 B1 * | 1/2001 | Nagata | 455/416 |
| 6,381,230 B1 * | 4/2002 | Wheatley et al. | 370/328 |
| 6,381,461 B1 * | 4/2002 | Besson et al. | 455/450 |
| 6,405,048 B1 * | 6/2002 | Haartsen | 455/464 |
| 6,424,633 B1 * | 7/2002 | von Brandt | 370/280 |
| 6,452,940 B1 * | 9/2002 | Yared et al. | 370/465 |
| 6,708,028 B1 * | 3/2004 | Byrne | 455/426.1 |
| 6,944,148 B1 * | 9/2005 | Gehring et al. | 370/347 |

FOREIGN PATENT DOCUMENTS

WO   WO 99/38343   7/1999

\* cited by examiner

*Primary Examiner*—Andrew C. Lee
(74) *Attorney, Agent, or Firm*—Sughrue Mion, PLLC

(57) ABSTRACT

A method is disclosed of synchronizing the operation of two or more interfaces sharing shared communication means or a shared communication resource. The periods of operation of the interfaces, and in particular the periods of use of the shared communication means or the shared communication resource, do not overlap.

17 Claims, 1 Drawing Sheet

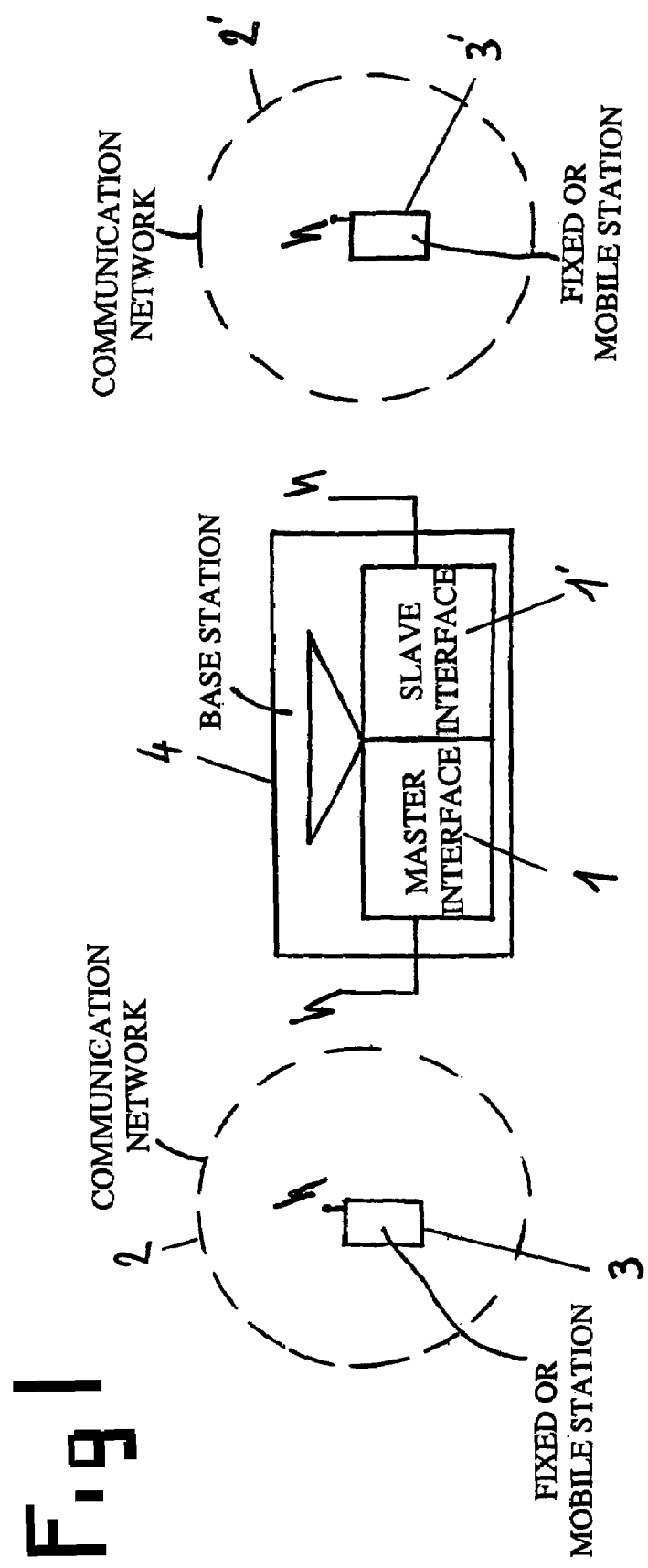

SYNCHRONIZED CONTENTION RESOLUTION AND BURST TIMING ALLOCATION IN THE OPERATION OF TWO OR MORE INTERFACES

BACKGROUND OF THE INVENTION

1. Field of the Invention

The present invention relates to communication between systems using a similar mode of communication, and a main object of the present invention is to provide a method of synchronizing (i.e., resolving contention between) two or more interfaces using the same communication resource.

2. Description of the Prior Art

Many transmission systems and communication devices are constructed around or connected to a plurality of send-receive interfaces for setting up unidirectional or bidirectional communication links or transmission connections with one or more other devices, stations or systems, possibly organized in the form of networks.

In some systems and devices the interfaces are obliged to share the same communication means or the same communication resource. This is the case in particular if the interfaces are all "air" interfaces or radiocommunication interfaces.

To prevent interaction or interference between the various interfaces, which would be harmful to the connections or links incorporating them, it is then necessary to ensure compatible use of the shared means or resource, in terms of access, efficient use and release.

The most obvious solution to the problem of ensuring compatible use, and the one that is the easiest to implement, entails the use of interfaces co-existing and operating independently of each other.

In the case of a system or device comprising a plurality of air interfaces it is necessary to ensure mutual electromagnetic compatibility at all times of the interfaces obliged to use the shared radio resource.

At present compatibility is achieved either by using different frequency bands at the various interfaces, which are sufficiently far apart in the radio spectrum to authorize simultaneous sending/receiving by the interfaces, or by designing the interfaces so that any interaction or interference caused by the other interfaces is attenuated or filtered.

However, these existing solutions are not satisfactory and all have significant limitations and/or drawbacks.

Using frequency bands that are far apart raises the problem of the availability of bands satisfying the applicable criteria appropriate to the interfaces concerned, and in fact leads to the creation of multiple resources (one for each interface), each frequency band having to be considered as a separate radio resource, rather than sharing a shared resource.

What is more, the additional cost of reciprocal filtering of interference between the various interfaces can be high and incompatible with products intended for private individuals or consumers, for example base stations of CTS local area networks integrating an interface to a microwave public telecommunication network.

What is more, given their composition and/or their mode of operation, some communication systems or devices are unable to support independent ports, or to allow independent use of a shared resource by a plurality of separate interfaces.

A particular object of the present invention is to alleviate the above drawbacks.

SUMMARY OF THE INVENTION

To this end, the present invention synchronizes the operation of (i.e., resolves contentious use between) two or more interfaces sharing the same communication means or the same communication resource, wherein periods of use of the interfaces, in particular periods of use of the shared means or resource, do not overlap, at least two external interfaces each provide an interface with a corresponding communication network and can be interconnected to provide a bidirectional transmission link between the two networks, the networks each include one or more mobile or fixed units or stations, and:

one of the interfaces is made a master interface relative to other fixed or mobile units or stations of the associated network and the other of the interfaces is made a slave of the associated network, to which it can be connected, operation of the master interface is made dependent on the slave interface, and each interface is allocated specific time periods to use the shared resource and the time of the network of the slave interface is imposed on the master interface and the associated network.

BRIEF DESCRIPTION OF THE DRAWINGS

The invention will be better understood from the following description, which relates to a preferred embodiment and is given by way of non-limiting example, and is explained with reference to the accompanying diagrammatic drawing, the single figure of which is a diagram showing a communication device integrating two interfaces sharing a radio resource.

DETAILED DESCRIPTION OF THE PREFERRED EMBODIMENTS

In accordance with the invention, the method of resolving contention in the use by two or more interfaces 1, 1' of the same communication means or the same communication resource, by sychronizing the operations of the interfaces, is characterized in that the periods of operation of the interfaces, and in particular their periods of use of the shared resource, do not overlap.

The basic principle of the present invention is to make the operation of the interfaces 1, 1' interdependent, by assigning different intervals for use of the shared resource, resulting in synchronization of such shared use, preventing any conflict for access to and use of the resource, without compromising the performance of either of the interfaces 1, 1'.

Note that the field of application of the basic principle of the invention is vast and can encompass any type of interface and any type or kind of shared resource.

What is more, although the invention is described more particularly here in relation to synchronizing two interfaces, its application to synchronizing three or more interfaces will be obvious to the skilled person.

A preferred, but non-limiting, embodiment of the invention can advantageously be employed when there are two or more external interfaces 1, 1' each of which provides the interface to a corresponding communication network 2, 2' and can interconnect a bidirectional transmission link between the two networks, each of which comprises one or more (preferably a plurality of) mobile and/or fixed units or stations 3, 3'.

In this case, said synchronization method can advantageously:

make one interface 1 a master interface relative to other fixed or mobile units or stations 3 of the associated network 2 and the other interface 1' a slave of the associated network 2', to which it can be connected, make operation of the master interface 1 dependent on the slave interface 1', and allocate each interface 1, 1' specific time periods to use the shared resource and impose the time of the network 2' of the slave interface 1' on the master interface 1 and the associated network 2.

As shown in the accompanying drawing, the two interfaces 1 and 1' can be part of the same communication device 4 forming the fixed base station or a fixed base station at least of the network 2 corresponding to the master interface 1.

The two networks 2, 2' interconnected by the two interfaces 1, 1' are preferably time-division multiple access (TDMA) networks.

Because unpredictable events can affect the shared resource and requests can pass through it at any time (for example a request for communication between components of the two networks), and to preserve at all times the interdependent relationship between the two interfaces 1, 1', their temporal synchronization is maintained when the shared resource is not being used, and in particular when there is no communication between the two networks 2 and 2'.

In particular, when the network 2' associated with the slave interface 1' is a cellular network, a change of cell generally results in modification of the time of the slave interface 1' and consequent modification of the time of the master interface 1 and its affiliated network 2, by transmitting information relating to the time of the affiliated network 2'.

As a general rule, temporal synchronization of the two interfaces 1, 1' is established or updated at the time of setting up a communication channel between the two networks 2, 2' via the interfaces 1, 1'. Synchronization can be updated during a call by modifying the time and/or the time slots allocated to the master interface 1 at the time of a change of connection of the slave interface 1' in the network 2' to which it is affiliated, by modifying the channel or a connection intermediary or by changing the unit or the station of the network 2' to which it is connected.

According to one feature of the invention, in the case of a communication request from the network 2' associated with the slave interface 1', the synchronization method first sets up the connection from the calling fixed or mobile station 3' to the slave interface 2' and then sets up the connection between the master interface 1 and the destination mobile or fixed station 3 of the corresponding network 2. The time slots of the master interface 1/network 2 connection are compatible with the time slots imposed on the slave interface 1' by the network 2' with which it is affiliated to synchronize the interfaces, in particular with respect to use of the shared resource.

In a first embodiment of the invention, in the case of a communication request from a fixed or mobile station 3 of the network 2 associated with the master interface 1, the method can first request communication of the slave interface 1' with the destination mobile or fixed unit or station 3' of the network 2' with which it is affiliated and then, after that communication has been set up, set up the connection between the master interface 1 and the destination mobile or fixed station 3 of the corresponding network 2, the time slots of the master interface 1/network 2 connection being compatible with the time slots imposed on the slave interface 1' by the network 2' with which it is affiliated to synchronize the interfaces, in particular with respect to use of the shared resource.

The communication request from the network 2 is therefore treated as a request from the network 2', the only difference being that it is initiated by the slave interface 1'.

In a second embodiment of the invention, in the case of a communication request from a fixed or mobile station 3 of the network 2 associated with the master interface 1, the method can set up a first connection between the calling fixed or mobile station 3 and the master interface 1, then set up a second connection between the slave interface 1' and the destination mobile or fixed station 3' of the network 2' with which it is affiliated, and finally adapt the first connection to the second connection, in particular by synchronizing the use of the shared resource by the interfaces 1, 1'.

In a preferred application of the invention, the network associated with the master interface 1 is a cordless telephone local area network 2 including two or more mobile stations or cordless telephones 3, preferably of the CTS type, and the network 2' associated with the slave interface 1' is a cellular radio-frequency telecommunication network, preferably of the GSM type, that network preferably treating the slave interface 1' as a mobile station affiliated to the network.

The networks are not limited to GMS and CTS networks, of course. In particular, they could be UMTS networks.

The information needed for implementing one embodiment and one practical mode of operation of a network interconnection system of the above kind, consisting of connecting the base station 4 of the CTS local area network (including two mobile stations CTS1 and CTS2, for example) to the GSM cellular network 2' via the air interface 1' of the base station, is described in particular in the 1999 versions of ETSI Recommendations 03.56, 03.08, 05.56 and 05.10; this kind of system is derived from the prior art CTS local area network/public switched telephone network interconnection system.

The synchronization method is described above on the basis of connecting a station of a first network with a station of a second network.

It can also be applied to connecting two stations of a first network with a station of a second network (three-way conference call function).

The table below shows by way of example the allocation of successive operating time slots in the case of connecting two mobile stations CTS1 and CTS2 of a CTS local area network with a mobile station of a GSM network.

In the table:

Rx means reception,

Tx means transmission,

"up" means "to" or "toward", and

"down" means "from".

The present invention also provides a device 4 for interconnecting two communication networks 2 and 2', including two external send/receive interfaces 1 and 1' sharing the same resource, for example a radio communication resource, and each allocated to the interface with one of the networks, characterized in that the operation of the two interfaces 1 and 1' is synchronized in accordance with the method described above.

In a preferred embodiment of the invention, shown diagrammatically in the single figure on the accompanying drawing, in the case of a communication request from a fixed or mobile station 3 of the network 2 associated with the master interface 1, a first connection is setup between the calling fixed or mobile station 3 and the master interface 1, then a second connection is set up between the slave interface 1' and the destination mobile or fixed station 3' of the network 2' with which it is affiliated, and finally the first connection is adapted to the second connection, in particular by synchronizing (i.e., resolving contentious use of the shared resource by the interfaces 1, 1', the device 4 forming the base station of the cordless telephone local area network 2 and supporting interworking of the two interfaces 1 and 1'.

Of course, the invention is not limited to the embodiment described and shown in the accompanying drawing, which can be modified without departing from the scope of protection of the invention, in particular from the point of view of the constitution of its various components or by substituting technical equivalents.

fixed station of the associated network, said time periods for said master interface/network connection being compatible with said time intervals imposed on said slave interface by said associated network, to synchronize said interfaces, in particular with regard to use of said shared resource.

2. The method claimed in claim 1, wherein said interfaces are part of a same communication device forming the fixed base station or a fixed base station at least of said network associated with said master interface, and wherein said two networks interconnected by said two interfaces are time division multiple access networks.

| 0 | 1 | 2 | 3 | 4 | 5 | 6 | 7 | Notes |
|---|---|---|---|---|---|---|---|---|
| Rx GSM down | | | Tx GSM up | | | | | two Tx |
| | Tx CTS1 down | Tx CTS2 down | | Rx CTS1 up | Rx CTS2 up | | | |
| Rx GSM down | | | Tx GSM up | | | | | two Tx |
| | Tx CTS2 down | Tx CTS1 down | | Rx CTS2 up | Rx CTS1 up | | | |
| Rx GSM down | | | Tx GSM up | | | | | two Tx |
| | | Tx CTS1 down | Tx CTS2 down | | Rx CTS1 up | Rx CTS2 up | | |
| Rx GSM down | | | Tx GSM up | | | | | two Tx |
| | | TxCTS2 down | TxCTS1 down | | Rx CTS2 up | Rx CTS1 up | | |
| Rx GSM down | | | Tx GSM up | | | | | two Tx |
| | | | Tx CTS1 down | Tx CTS2 down | | Rx CTS1 up | Rx CTS2 up | |
| Rx GSM down | | | Tx GSM up | | | | | two Tx |
| | | | Tx CTS2 down | Tx CTS1 down | | Rx CTS2 up | Rx CTS1 up | |
| RX GSM down Rx CTS2 up | | | Tx GSM up | Tx CTS1 down | Tx CTS2 down | | Rx CTS1 up | two Rx |
| Rx GSM down Rx CTS1 up | | | Tx GSM up | Tx CTS2 down | Tx CTS1 down | | Rx CTS2 up | two Rx |
| Rx GSM down Rx CTS1 up | Rx CTS2 up | | Tx GSM up | | | Tx CTS1 down | Tx CTS2 down | two Rx |
| Rx GSM down Rx CTS2 up | Rx CTS1 up | | Tx GSM up | | | Tx CTS2 down | Tx CTS1 down | two Rx |

The invention claimed is:

1. A method of resolving contention between at least two interfaces sharing the same communication means or the same communication resource, by synchronization of operation of said interfaces wherein:
   periods of use of said interfaces, in particular periods of use of said shared means or resource, do not overlap,
   each of said interfaces provides an interface with a corresponding one of two communication networks and can be interconnected to provide a bidirectional transmission link between said two networks, and
   said networks each include one or more mobile or fixed units or stations;
   said method comprising the steps of:
   making one of said interfaces a master interface relative to other fixed or mobile units or stations of the associated network, and making another of said interfaces a slave of the associated network, to which it can be connected,
   making operation of said master interface dependent on said slave interface,
   allocating to each interface specific time periods to use said shared resource, and imposing the time of said network of said slave interface on said master interface and said associated network, and
   in the event of a call request from said network associated with said slave interface, first setting up the connection of the calling fixed or mobile station with said slave interface, and then setting up the connection between said master interface and the destination mobile or 3. The method claimed in claim 1, wherein said synchronization of said two interfaces is maintained when said shared resource is not being used and in particular when there is no communication between said two networks.

4. The method claimed in claim 1, wherein said synchronization of said two interfaces is established or updated on setting up a communication channel between said two networks via said interfaces, and can be updated during a call by modifying said time and/or said time periods allocated to said master interface at the time of a change of connection of said slave interface in said associated network.

5. The method claimed in claim 1, wherein said network associated with said master interface is a cordless telephone local area network including two or more mobile stations or cordless telephones, and wherein said network associated with said slave interface is a cellular radio-frequency telecommunication network.

6. The method claimed in claim 5 wherein said two or more mobile stations or cordless telephones are of the CTS type, said network associated with said slave interface is of the GSM type, and said slave interface is regarded by said network as a mobile station associated with it.

7. A method of resolving contention between at least two interfaces sharing the same communication means or the same communication resource, by synchronization of operation of said interfaces wherein:
   periods of use of said interfaces, in particular periods of use of said shared means or resource, do not overlap,
   each of said interfaces provides an interface with a corresponding one of two communication networks and can be interconnected to provide a bidirectional transmission link between said two networks, and said networks each include one or more mobile or fixed units or stations;

said method comprising the steps of:

making one of said interfaces a master interface relative to other fixed or mobile units or stations of the associated network, and making another of said interfaces a slave of the associated network, to which it can be connected, making operation of said master interface dependent on said slave interface, allocating to each interface specific time periods to use said shared resource, and imposing the time of said network of said slave interface on said master interface and said associated network, and in the event of a call request from a fixed or mobile station of said network associated with said master interface, first requesting communication of said slave interface with the destination mobile or fixed unit or station of said associated network, and then, after said communication has been set up, setting up a connection between said master interface and said destination mobile or fixed station of said associated network, said time periods of said master interface/network connection being compatible with said time slots imposed on said slave interface by said associated network, to synchronize said interfaces, in particular with regard to use of said shared resource.

8. A method of resolving contention between at least two interfaces sharing the same communication means or the same communication resource, by synchronization of operation of said interface wherein:

periods of use of said interfaces, in particular periods of use of said shared means or resource, do not overlap, each of said interfaces provides an interface with a corresponding one of two communication networks and can be interconnected to provide a bidirectional transmission link between said two networks, and said networks each include one or more mobile or fixed units or stations;

said method comprising the steps of:

making one of said interfaces a master interface relative to other fixed or mobile units or stations of the associated network, and making another of said interfaces a slave of the associated network, to which it can be connected, making operation of said master interface dependent on said slave interface, allocating to each interface specific time periods to use said shared resource, and imposing the time of said network of said slave interface on said master interface and said associated network, and in the event of a call request from a fixed or mobile station of said network associated with said master interface, setting up a first connection between said calling fixed or mobile station and said master interface, then setting up a second connection between said slave interface and said destination mobile or fixed station of said associated network, and finally adapting said first connection to said second connection, in particular by synchronizing use of said shared resource by said interfaces.

9. A device for interconnecting two communication networks, including two external send-receive interfaces using a shared resource, for example a radio communication resource, each allocated to interfacing with one of said networks, wherein contentious use of said shared resource by said two interfaces is resolved by synchronized operation of said two interfaces by a method wherein: periods of use of said interfaces, in particular periods of use of said shared means or resource, do not overlap, each of said interfaces provides an interface with a corresponding one of said two communication networks and can be interconnected to provide a bidirectional transmission link between said two networks, said networks each include one or more mobile or fixed units or stations, one of said interfaces is made a master interface relative to other fixed or mobile units or stations of the associated network, and the other of said two interfaces is made a slave of the associated network, to which it can be connected, operation of said master interface is made dependent on said slave interface, and each interface is allocated specific time periods to use said shared resource, and the time of said network of said slave interface is imposed on said master interface and said associated network, and wherein, in the event of a call request from said network associated with said slave interface, the connection of the calling fixed or mobile station with said slave interface is set up first and then the connection is set up between said master interface and the destination mobile or fixed station of the associated network, said time periods for said master interface/network connection being compatible with said time intervals imposed on said slave interface by said associated network, to synchronize said interfaces, in particular with regard to use of said shared resource.

10. The device claimed in claim 9, wherein said two interfaces are part of the same communication device forming the fixed base station or a fixed base station at least of said network associated with said master interface and said two networks interconnected by said two interfaces are time division multiple access networks.

11. The device claimed in claim 9, wherein said synchronization of said two interfaces is maintained when said shared resource is not being used and in particular when there is no communication between said two networks.

12. The device claimed in claim 9, wherein said synchronization of said two interfaces is established or updated on setting up a communication channel between said two networks via said interfaces and can be updated during a call by modifying said time and/or said time periods allocated to said master interface at the time of a change of connection of said slave interface in said associated network.

13. The device claimed in claim 9, wherein said network associated with said master interface is a cordless telephone local area network including two or more mobile stations or cordless telephones and said network associated with said slave interface is a cellular radio-frequency telecommunication network.

14. The device claimed in claim 13 wherein said two or more mobile stations or cordless telephones are of the CTS type, said network associated with said slave interface is of the GSM type, and said slave interface is regarded by said network as a mobile station associated with it.

15. A device for interconnecting two communication networks, including two external send-receive interfaces using a shared resource, for example a radio communication resource, each allocated to interfacing with one of said networks, wherein contentious use of said shared resource by said two interfaces is resolved by synchronized operation of said two interfaces by a method wherein: periods of use of said interfaces, in particular periods of use of said shared means or resource, do not overlap, each of said interfaces provides an interface with a corresponding one of said two communication networks and can be interconnected to provide a bidirectional transmission link between said two networks, said networks each include one or more mobile or fixed units or stations, one of said interfaces is made a master interface relative to other fixed or mobile units or stations of the associated network, and the other of said two interfaces is made a slave of the associated network, to which it can be connected, operation of said master interface is made dependent on said slave interface, and each interface is allocated specific time periods to use said shared resource, and the time of said network of said slave interface is imposed on said master interface and said associated network, and wherein, in the event of a call request from a fixed or mobile station of said network associated with said master interface, communication of said slave interface with the destination mobile or fixed unit or station of said associated network is requested first and then, after said communication has been set up, a connection is set up between said master interface and said destination mobile or fixed station of said associated network, said time periods of said master interface/network connection being compatible with said time slots imposed on said slave interface by said associated network, to synchronize said interfaces, in particular with regard to use of said shared resource.

16. A device for interconnecting two communication networks, including two external send-receive interfaces using a shared resource, for example a radio communication resource, each allocated to interfacing with one of said networks, wherein contentious use of said shared resource by said two interfaces is resolved by synchronized operation of said two interfaces by a method wherein: periods of use of said interfaces, in particular periods of use of said shared means or resource, do not overlap, each of said interfaces provides an interface with a corresponding one of said two communication networks and can be interconnected to provide a bidirectional transmission link between said two networks, said networks each include one or more mobile or fixed units or stations, one of said interfaces is made a master interface relative to other fixed or mobile units or stations of the associated network, and the other of said two interfaces is made a slave of the associated network, to which it can be connected, operation of said master interface is made dependent on said slave interface, and each interface is allocated specific time periods to use said shared resource, and the time of said network of said slave interface is imposed on said master interface and said associated network, and wherein, in the event of a call request from a fixed or mobile station of said network associated with said master interface, a first connection is set up between said calling fixed or mobile station and said master interface, a second connection is then set up between said slave interface and said destination mobile or fixed station of said associated network, and finally said first connection is adapted to said second connection, in particular by synchronizing use of said shared resource by said interfaces.

17. A device for interconnecting two communication networks, including two external send-receive interfaces using a shared resource, for example a radio communication resource, each allocated to interfacing with one of said networks, wherein contentious use of said shared resource by said two interfaces is resolved by synchronized operation of said two interfaces by a method wherein: periods of use of said interfaces, in particular periods of use of said shared means or resource, do not overlap, each of said interfaces provides an interface with a corresponding one of said two communication networks and can be interconnected to provide a bidirectional transmission link between said two networks, said networks each include one or more mobile or fixed units or stations, one of said interfaces is made a master interface relative to other fixed or mobile units or stations of the associated network, and the other of said two interfaces is made a slave of the associated network, to which it can be connected, operation of said master interface is made dependent on said slave interface, and each interface is allocated specific time periods to use said shared resource, and the time of said network of said slave interface is imposed on said master interface and said associated network, said device forming a base station of a cordless telephone local area network and supporting functional cooperation of said two interfaces, wherein, in the event of a call request from a fixed or mobile station of said network associated with said master interface, a first connection is set up between said calling fixed or mobile station and said master interface, then a second connection is set up between said slave interface and said destination mobile or fixed station of said associated network, and finally said first connection is adapted to said second connection, in particular by synchronizing use of said shared resource by said interfaces.

* * * * *